United States Patent
Choi

(10) Patent No.: US 11,273,782 B2
(45) Date of Patent: Mar. 15, 2022

(54) AIRBAG APPARATUS FOR VEHICLE

(71) Applicants: Hyundai Motor Company, Seoul (KR); Kia Motors Corporation, Seoul (KR)

(72) Inventor: Jae Ho Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1 day.

(21) Appl. No.: 16/855,835

(22) Filed: Apr. 22, 2020

(65) Prior Publication Data
US 2021/0094497 A1 Apr. 1, 2021

(30) Foreign Application Priority Data
Sep. 26, 2019 (KR) .................. KR10-2019-0118629

(51) Int. Cl.
| | |
|---|---|
| *B60R 21/203* | (2006.01) |
| *B60R 21/2338* | (2011.01) |
| *B60R 21/26* | (2011.01) |
| *B60R 21/2165* | (2011.01) |

(52) U.S. Cl.
CPC ........ *B60R 21/203* (2013.01); *B60R 21/2165* (2013.01); *B60R 21/2338* (2013.01); *B60R 21/26* (2013.01); *B60R 2021/21652* (2013.01)

(58) Field of Classification Search
CPC ... B60R 21/203; B60R 21/2338; B60R 21/26; B60R 21/2165; B60R 2021/21652; B60R 2021/23107; B60R 2021/2612; B60R 21/261; B60R 2021/23384; B60R 21/2032; B60R 21/264; B60R 21/233
See application file for complete search history.

(56) References Cited

U.S. PATENT DOCUMENTS

| | | | |
|---|---|---|---|
| 7,823,916 B2 * | 11/2010 | Piotrowski | B60R 21/203 280/731 |
| 9,744,932 B1 | 8/2017 | Faruque et al. | |
| 10,005,177 B2 * | 6/2018 | Rimatzki | B62D 1/06 |
| 10,737,648 B2 * | 8/2020 | Nagasawa | B60R 21/203 |
| 10,899,309 B2 * | 1/2021 | Hotta | B60R 21/203 |
| 2017/0225641 A1 | 8/2017 | Faruque et al. | |
| 2017/0247006 A1 | 8/2017 | Rao et al. | |
| 2017/0259772 A1 | 9/2017 | Farooq et al. | |
| 2017/0259774 A1 | 9/2017 | Matsushita et al. | |
| 2018/0086297 A1 * | 3/2018 | Bodtker | B60K 35/00 |
| 2021/0053524 A1 * | 2/2021 | Yamamoto | B60R 21/2338 |

FOREIGN PATENT DOCUMENTS

| | | |
|---|---|---|
| EP | 327258 A1 | 1/2018 |
| EP | 3272578 A1 | 1/2018 |
| KR | 10-2012-0044831 A | 5/2012 |

* cited by examiner

*Primary Examiner* — Drew J Brown
(74) *Attorney, Agent, or Firm* — Morgan, Lewis & Bockius LLP

(57) ABSTRACT

An airbag apparatus of a vehicle may include an airbag cushion mounted in a rim which is necessarily provided even if the shape of a steering wheel is diversified, so that the airbag cushion is applied to steering wheels having various designs, whereby a driver is protected.

12 Claims, 8 Drawing Sheets

AIRBAG APPARATUS FOR VEHICLE

CROSS-REFERENCE TO RELATED APPLICATION

The present application claims priority to Korean Patent Application No. 10-2019-0118629, filed Sep. 26, 2019, the entire contents of which is incorporated herein for all purposes by this reference.

BACKGROUND OF THE INVENTION

Field of the Invention

The present invention relates to an airbag apparatus for a vehicle, and more particularly, to an airbag apparatus for a vehicle that can have a driver seat airbag inside various shapes of steering wheels of driver seat airbags that are mounted inside a steering wheel.

Description of Related Art

Technologies for securing drivability, convenience, and functionality of a vehicle and safety of passengers have been developed.

An airbag which is one of various automotive safety devices is used as a device which is the most useful for protecting a passenger from shock.

An airbag is a device configured for protecting a driver or a passenger in a vehicle collision and includes a collision sensor that detects a vehicle collision, a controller that operates the airbag, depending on the detecting result by the collision sensor, and an airbag module that operates the airbag in a response to a signal from a controller. Airbags are classified into a driver airbag, passenger airbag, a side airbag, and a roof airbag, depending on the installation position and the object to protect.

A driver airbag is mounted inside a steering wheel, but various shapes of steering wheels are applied to future types of vehicles, so there is a limit in installing a driver seat inside a steering wheel.

Various designs of steering wheels have been developed such as a steering wheel with a display at the center portion or a noncircular steering wheel, but there is a problem that there is a limit in installing a driver airbag at the center portion of future types of automotive steering wheels.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing the problems and an aspect of the present invention is directed to providing an airbag apparatus of a vehicle that safely protect a driver by applying a driver seat airbag commonly to various shapes of steering wheels.

In view of the foregoing, an airbag apparatus includes: a steering wheel mounted on a vehicle body in front of a driver seat and having a rim having an internal space along a circumference thereof; and a rim cushion mounted in the internal space of the rim and configured of inflating to cover the rim by unfolding rearward toward the driver seat from the circumference of the rim when a collision situation occurs and a gas of an inflator is supplied.

The airbag apparatus further includes a central cushion mounted in the internal space of the rim and configured to be deployed toward inside of the rim to be positioned inside the rim when a gas is supplied from the inflator.

The central cushion has a width greater than an internal width of the inflating rim cushion when inflating.

The steering wheel has a hub portion to be mounted on the vehicle body and the inflator is mounted in the hub portion and connected to the rim cushion and the central cushion to supply a gas into the rim cushion and the central cushion.

The central cushion is positioned at a joint between the rim and the hub portion, and the central cushion is deployed toward the inside of the rim when a gas is supplied from the inflator.

The airbag apparatus may further include a retaining tether having a first end portion fixed to a rear side of the central cushion and a second end portion extending to the hub portion to restrict inflation of the central cushion and determine an inflation shape of the central cushion; and a tether cutter mounted in the hub portion to selectively cut or not the retaining tether.

When the tether cutter cuts the retaining tether, the central cushion inflates to have a width greater than the internal width of the rim cushion, and when the tether cutter does not cut the retaining tether, the central cushion inflates thicker in a front and rear direction thereof, as compared with the retaining tether is cut.

The rim has a gas supplier extending around the rim and having a plurality of open holes that communicates with the rim cushion through the internal space.

The open holes are formed such that sizes thereof gradually increase as they go away from a position where the gas is supplied from the inflator.

The inflator includes a plurality of inflators, which are a rim cushion inflator and a central cushion inflator, and the rim cushion inflator and the central cushion inflator are connected to the rim cushion and the central cushion, respectively, to supply a gas to the rim cushion and the central cushion.

When a collision situation occurs, a gas is supplied from the rim cushion inflator and then a gas is supplied from the central cushion inflator so that the rim cushion is deployed and then the central cushion is unfolded.

The steering wheel is configured to be drawn out from or stowed in the vehicle body, and when a collision situation occurs, the steering wheel is drawn out and then the gas of the inflator is supplied.

According to the airbag apparatus of a vehicle that has the structure described above, the airbag cushion is mounted in the rim which is necessarily provided even if the shape of the steering wheel is diversified, so that the airbag cushion may be applied to steering wheels having various designs, whereby a driver is protected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
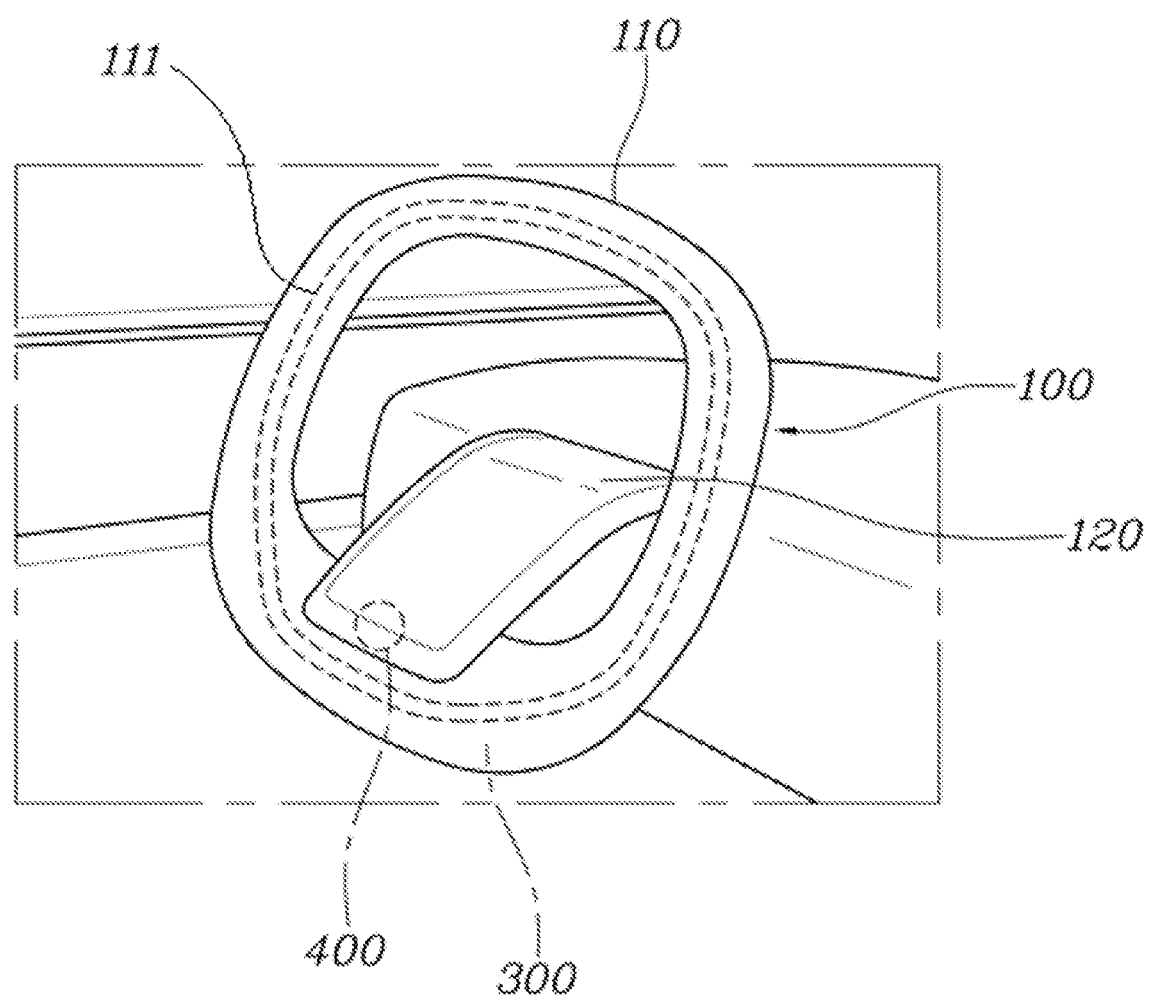
FIG. 1 is a view showing an airbag apparatus of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Airbag apparatuses for a vehicle according to exemplary embodiments of the present invention are described hereafter with reference to the accompanying drawings.

Figure 2:
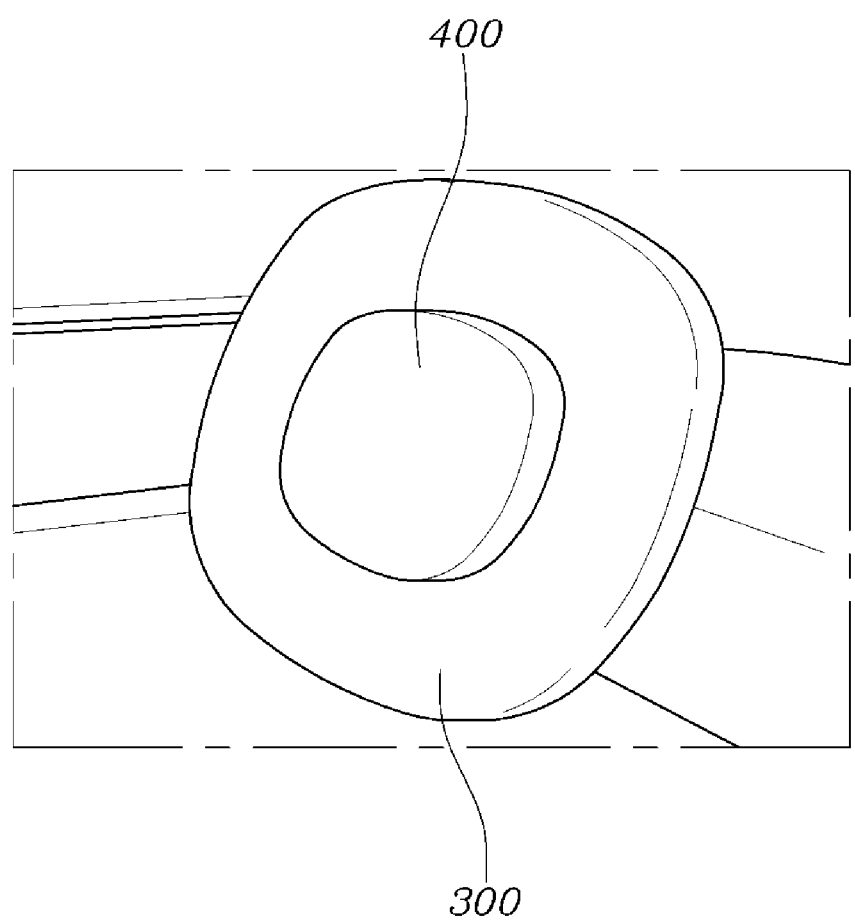
FIG. 2 is a view showing an deployed state of the airbag device for a vehicle shown in FIG. 1.
Figure 6:
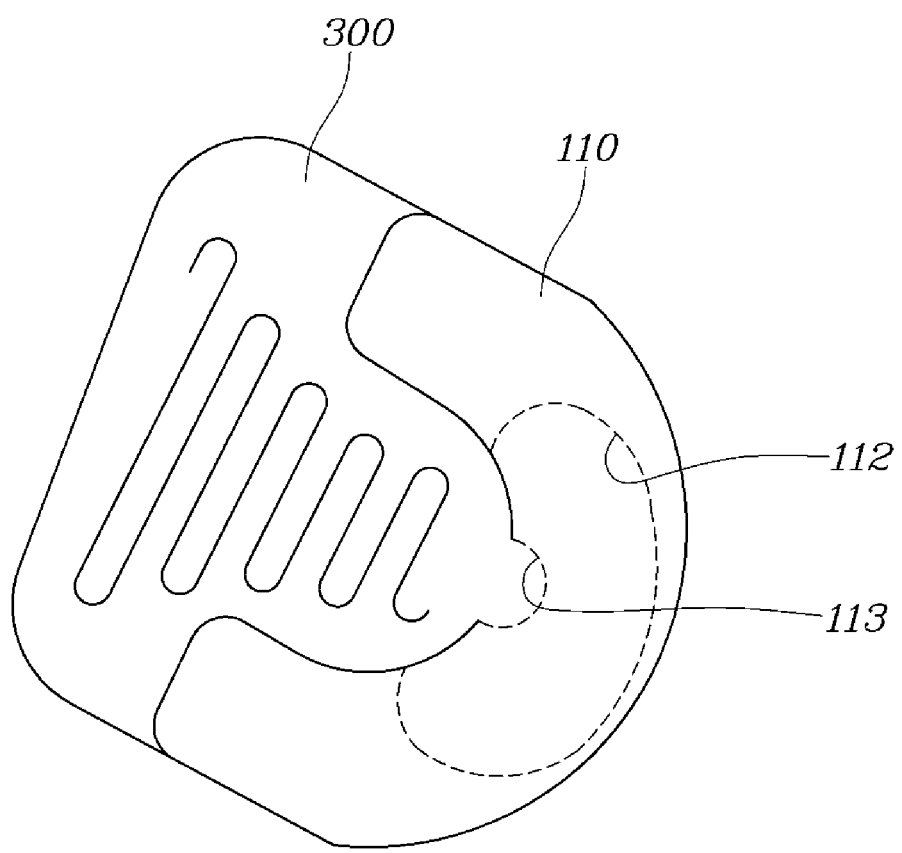
Figure 7:
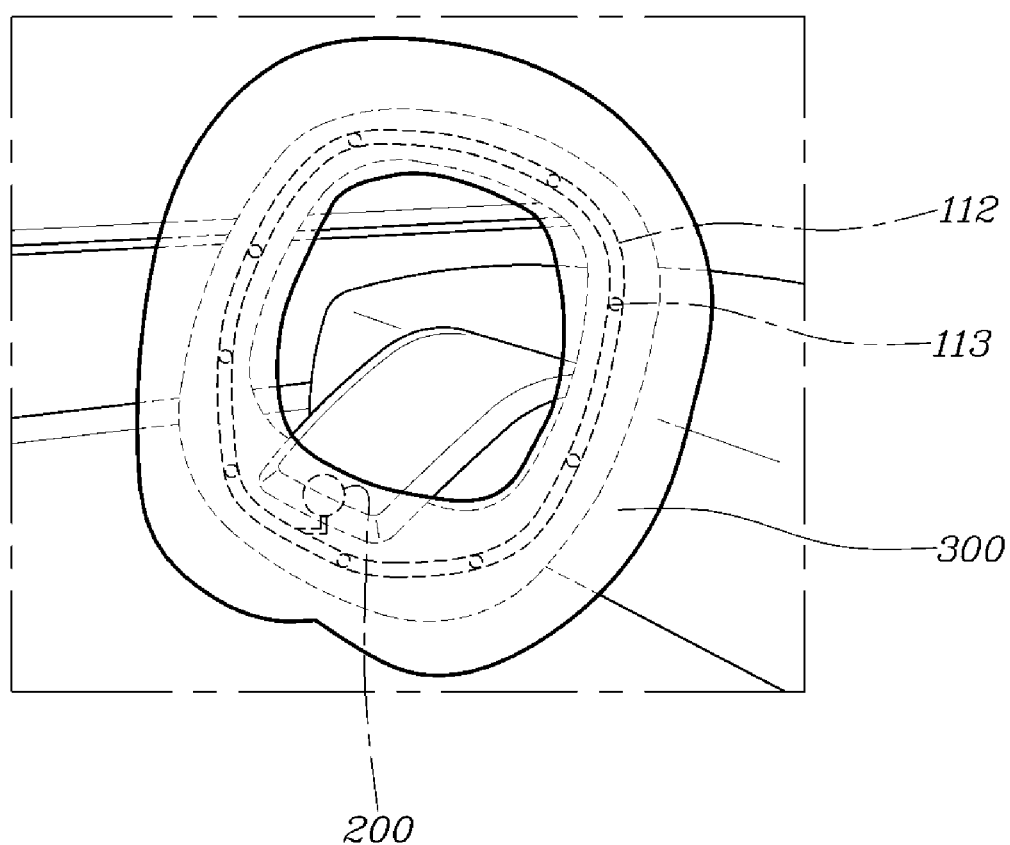
Figure 8:
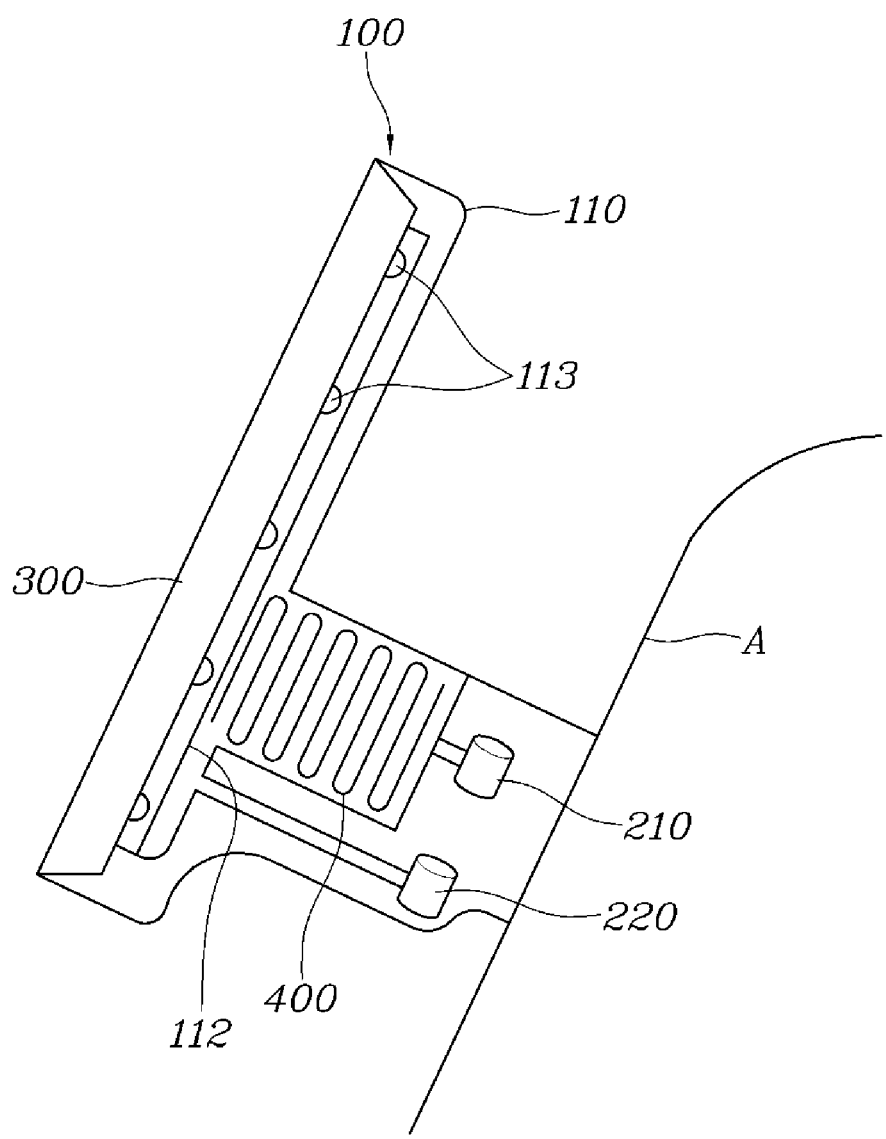
FIG. 8 is a view showing an airbag apparatus of a vehicle according to various exemplary embodiments of the present invention.

FIG. 1 is a view showing an airbag apparatus of a vehicle according to an exemplary embodiment of the present invention, FIG. 2 is a view showing an deployed state of the airbag device for a vehicle shown in FIG. 1, FIG. 3, FIG. 4, FIG. 5, FIG. 6 and FIG. 7 are views illustrating the airbag device for a vehicle shown in FIG. 1, and FIG. 8 is a view showing an airbag apparatus of a vehicle according to various exemplary embodiments of the present invention.

An airbag apparatus according to an exemplary embodiment of the present invention, as shown in FIG. 1 and FIG. 2, includes: a steering wheel 100 mounted on a vehicle body in front of a driver seat and having a rim 110 having an internal space 111 along the circumference thereof; and a rim cushion 300 mounted in the internal space of the rim 110 and inflating to cover the rim 110 by unfolding rearward toward the driver seat from the circumference of the rim 110 when a collision situation occurs and a gas of an inflator 200 is supplied.

That is, according to an exemplary embodiment of the present invention, the rim cushion 300 is mounted in the rim 110 of the steering wheel 100, and the rim cushion 300 deploys and inflates to cover the rim 110 when a collision situation occurs, preventing a driver from hitting against the steering wheel 100. In particular, since the rim cushion 300 is mounted in the rim 110 of the steering wheel 100, even if the shape of the steering wheel 100 is diversified, the airbag cushion is deployed from the steering wheel 100, being able to protect the driver.

For example, as may be seen in FIG. 1, if it is a future type vehicle, the center portion of the steering wheel 100 may be open or a display may be mounted at the center portion. That is, in such a future type vehicle, the necessity of the steering wheel 100 decreases, so that the structure of the steering wheel 100 is simplified. However, even if the steering wheel 100 is simplified, the rim 110 which is the edge portion is necessary. Accordingly, in an exemplary embodiment of the present invention, since the internal space 111 is provided at the rim 110 of the steering wheel 100 and the rim cushion 300 is mounted in the internal space 111, the airbag cushion that protects a driver may be deployed from the steering wheel 100 even if the shape of the steering wheel 100 is diversified. Furthermore, since when a vehicle collision situation occurs, the rim cushion 300 is deployed from the circumference of the rim 110 toward the driver seat and inflates to cover the rim 110, preventing injury of a driver due to hitting against the steering wheel 100.

In an exemplary embodiment of the present invention, a series of holes may be formed along a circumference of the rim 110 so that the rim cushion 300 is deployed through a gap formed when the a portion of the rim cushion 300 is torn along the series of the holes in the circumferential direction of the rim 110.

Meanwhile, as shown in FIG. 2, the airbag apparatus further includes a central cushion 400 mounted in the internal space 111 of the rim 110 and being unfolded outwardly toward the circumference of the rim 110 to be positioned inside the rim 110 when a gas is supplied from the inflator 200.

That is, the rim cushion 300 inflates to cover the rim 110 when it is unfolded, and the central cushion 400 inflates to be positioned inside the rim 110 and positioned at the center portion of the rim cushion 300 when it is unfolded, so that the steering wheel 100 is covered with the rim cushion 300 and the central cushion 400.

Accordingly, as may be seen in FIG. 2, when a collision situation occurs, the rim cushion 300 covers the rim 110 of the steering wheel 100 and the central cushion 400 covers the center portion of the steering wheel 100, preventing injury of a driver due to hitting against the steering wheel 100 or passing through the center portion of the steering wheel 100.

The central cushion 400 has a width which is greater than the internal width of the inflated rim cushion 300 when inflating, so when the cushions are unfolded, the central cushion 400 may be blocked by the rim cushion 300 without passing through the inside of the rim cushion 300. That is, since the entire width of the central cushion 400 is greater than the internal width of the rim cushion 300, when the rim cushion 300 and the central cushion 400 are deployed due to a vehicle collision situation, the central cushion 400 is blocked by the rim cushion 300 behind the rim cushion 300, so that the central cushion 300 is supported by the rim cushion 300 without passing through the inside of the rim cushion 300. Therefore, when a vehicle collision situation occurs and a driver comes in contact with the central cushion 400, the central cushion 400 is supported by the rim cushion 300, being able to safely protect the driver.

Figure 3:
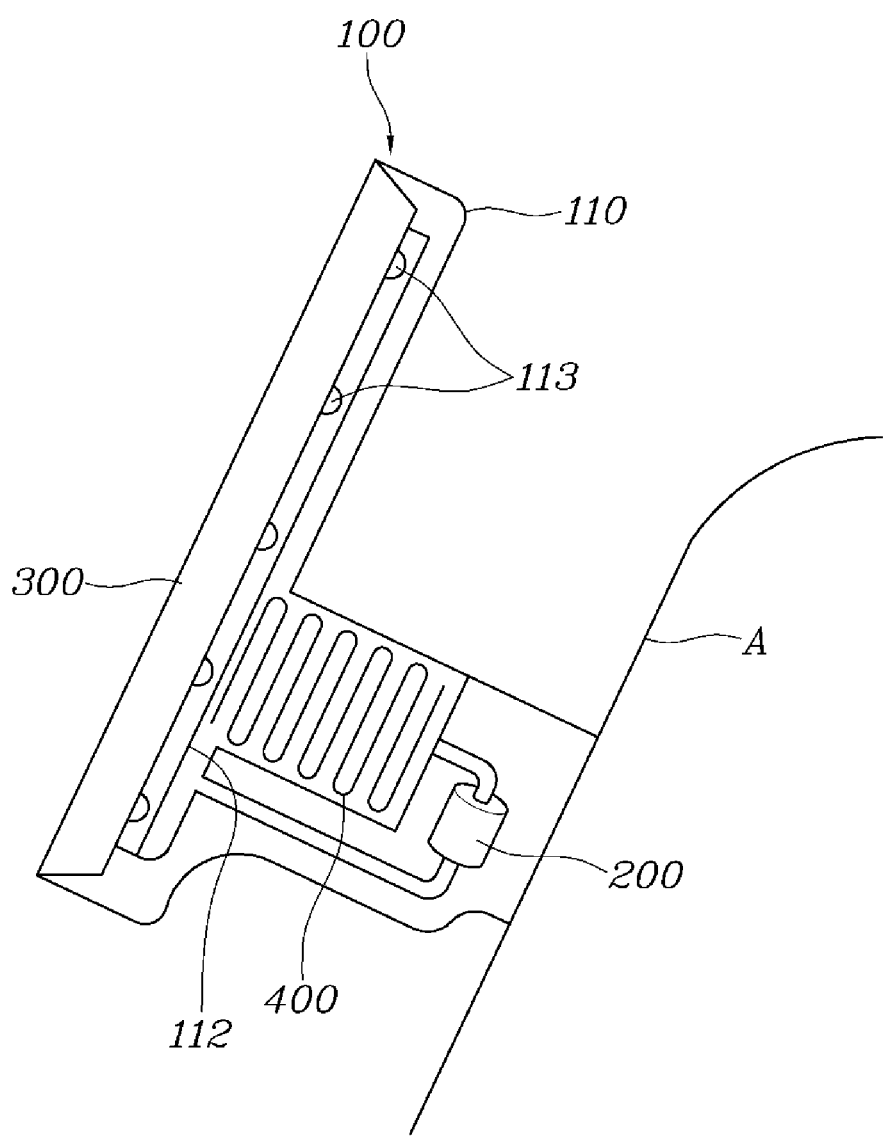
FIG. 3, FIG. 4, FIG. 5, FIG. 6 and FIG. 7 are views illustrating the airbag device for a vehicle shown in FIG. 1.

Meanwhile, as shown in FIG. 1, FIG. 2, and FIG. 3, the steering wheel 100 has a hub portion 120 for installation on a vehicle body and the inflator 200 may be mounted in the hub portion 120 and connected to the rim cushion 300 and the central cushion 400 to supply a gas into the cushions.

The hub portion 120 is provided so that the steering wheel 100 is rotatably mounted on a vehicle body and may include the column of the steering wheel 100. That is, the hub 120 is necessarily provided to install the steering wheel 100 on a vehicle body even if the steering wheel 100 is simplified, and the hub portion 120 has a space in which various portions including the inflator 200 are mounted. The central cushion 400 may be mounted in the hub portion 120 and the rim cushion 400 may be mounted in the rim 110 of the steering wheel 100.

Accordingly, the inflator 200 may be mounted in the hub portion 120 and is connected to the rim cushion 300 and the central cushion 400 to supply a gas to the cushions to deploy the rim cushion 300 and the central cushion 400 when a vehicle collision situation occurs.

On the other hand, the central cushion 400 may be positioned at the joint between the rim 110 and the hub portion 120, so that the central cushion 400 may be unfolded outwardly toward the circumference of the rim 110 when a gas is supplied from the inflator 200. Accordingly, the central cushion 400 may be mounted in the hub portion 120 at the joint between the rim 110 and the hub portion 120, whereby interference with the rim cushion 300 may be minimized.

As may be seen in FIG. 1, when the hub portion 120 is connected to the lower portion of the rim 110, the central cushion 400 is configured to be deployed upwards from under the steering wheel 100. That is, the folded position and direction of the central cushion 400 depend on the position of the joint between the rim 110 and the hub portion 120, and the central cushion 400 is positioned inside the rim 110 when it is unfolded.

Figure 4:
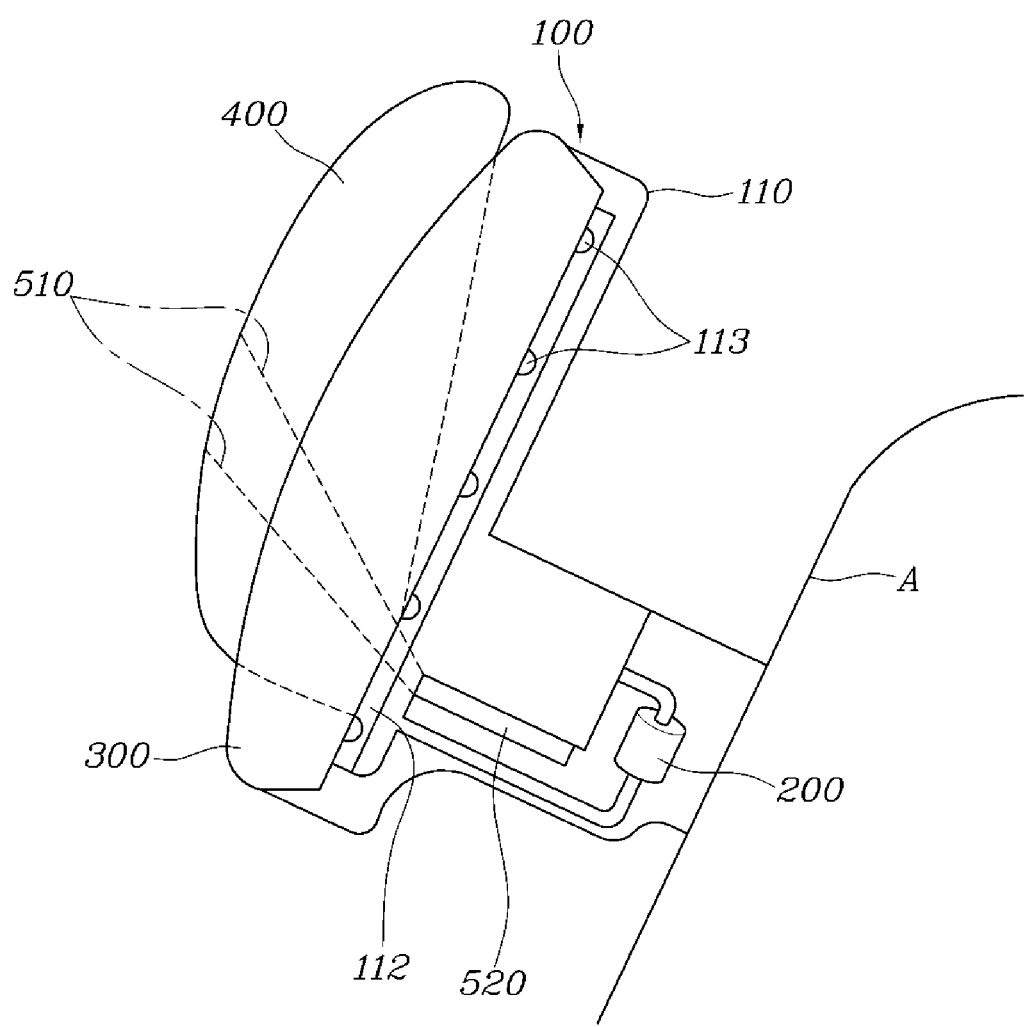

On the other hand, as shown in FIG. 3 and FIG. 4, the airbag apparatus may further include: a retaining tether 510 having a first end portion fixed to the rear side of the central cushion 400 and a second end portion extending to the hub portion 120 to restrict inflation of the central cushion 400 and determine the inflation shape of the central cushion 400; and a tether cutter 520 mounted in the hub portion 120 to selectively cut or not the retaining tether 510.

The retaining tether 510 and the tether cutter 520 are provided to change the inflation shape of the central cushion 400. That is, the tether cutter 520 cuts or does not cut the retaining tether 510 with the retaining tether 510 fixed to the rear side of the central cushion 400 and the second end portion extending and fixed to the hub portion 120, so that the inflation shape of the central cushion 400 may be a shape which is thick in the front and rear direction or a shape which is long in the up and down direction thereof.

In detail, when the tether cutter 520 cuts the retaining tether 510, the central cushion 400 inflates to have a width greater than the internal width of the rim cushion 300, and when the tether cutter 520 does not cut the retaining tether 510, the central cushion 400 may inflate thicker in the front and rear direction thereof, as compared with the retaining tether 510 is cut.

That is, as shown in FIG. 4, when the tether cutter 520 does not cut the retaining tether 510, rearward inflation of the central cushion 400 is restricted by the retaining tether 510, so that the central cushion 400 inflates in the up and down direction and has a shape extending in the up and down direction thereof.

Figure 5:
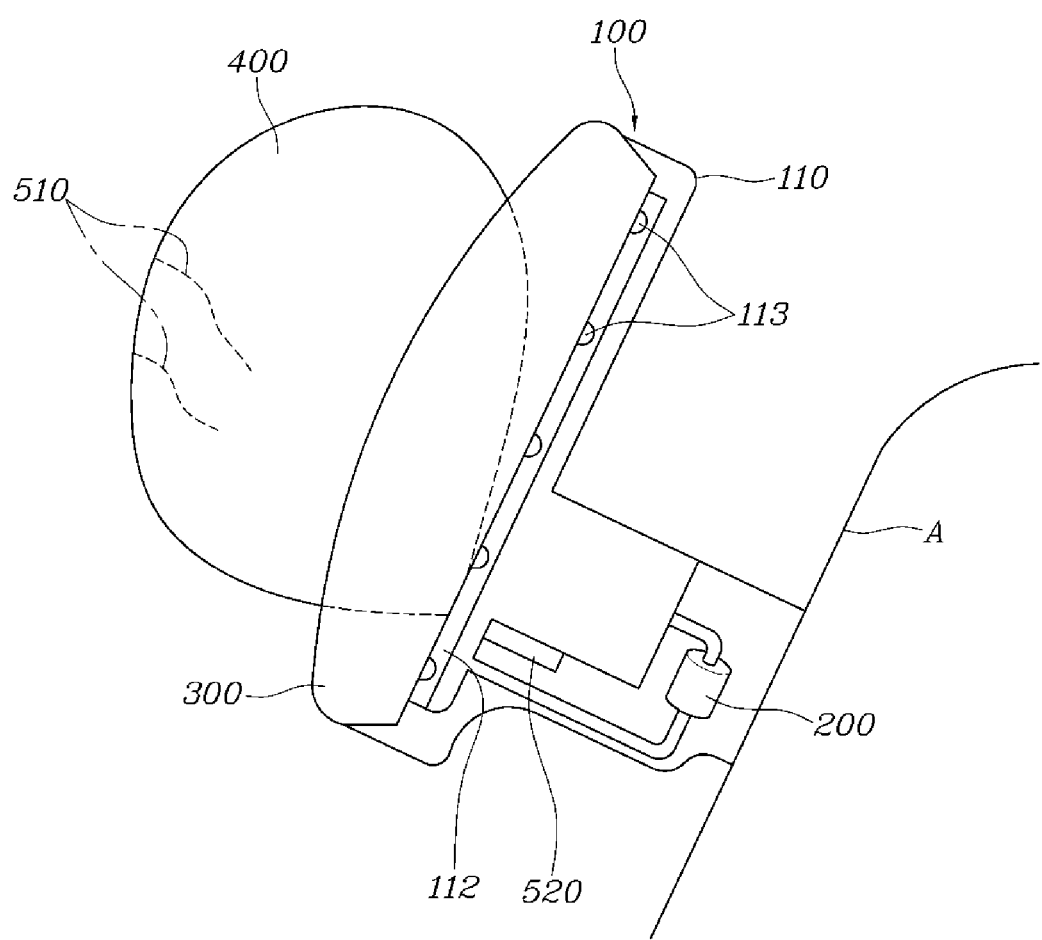

As shown in FIG. 5, when the tether cutter 520 cuts the retaining tether 510, rearward inflation of the central cushion 400 is allowed, so that the central cushion 400 inflates in the front and rear direction and accordingly has a shape extending rearward thereof.

Since the inflation shape of the central cushion is changed depending on whether the tether cutter 520 cuts or does not cut the retaining tether 510, the central cushion 400 may be changed into an optimal shape that can protect a driver in accordance with the posture of the driver and a collision situation, being able to stably protect the driver.

On the other hand, as shown in FIG. 6, a gas supplier 112 extending around the rim 110 and having a plurality of open holes 113 that communicates with the rim cushion 300 through the internal space 111 may be disposed at the rim 110. That is, the gas supplier 112 is mounted at the rim 110 so that the gas of the inflator 200 may be supplied to the rim cushion 300. The gas supplier 112 may be a tube and communicates with the rim cushion 300 through the internal space 111 by the open holes 113, so that the gas of the inflator 200 is provided to the rim cushion 300.

As shown in FIG. 7, the open holes 113 may be formed such that the sizes gradually increase as they go away from the position where the gas is supplied from the inflator 200. Accordingly, when a vehicle collision situation occurs, the gas supplied from the inflator 200 is provided to the rim cushion 300 through the gas supplier 112 and the open holes 113. In the instant case, the rim cushion 300 can uniformly inflate because the open holes 113 are formed such that the sizes gradually increase as they go away from the inflator 200.

That is, when most gas flows through the open holes 113 close to the inflator 200, the rim cushion 300 is rapidly deployed only at specific position on the steering wheel 100, so that the other portion of the steering wheel 100 is not covered. Accordingly, the sizes of the open holes 113 are set such that the rim cushion 300 uniformly inflates and covers the entire steering wheel 100 by the gas supplied from the inflator 200.

On the other hand, as shown in FIG. 8, the inflator 200 may include a plurality of inflators such as a rim cushion inflator 210 and a central cushion inflator 220, which may be connected to the rim cushion 300 and the central cushion 400, respectively, to supply a gas thereto.

That is, the rim cushion 300 may be disposed in the rim 110 of the steering wheel 100 and the central cushion 400 may be mounted in the hub portion 120 of the steering wheel, and the rim cushion 300 and the central cushion 400 may be configured to be separately deployed by the gases that are supplied from the rim cushion inflator 210 and the central cushion inflator 220, respectively.

Since the rim cushion 300 and the central cushion 400 are supplied with gases from the inflators 200, respectively, as described above, the amount of gas is secured, so that the rim cushion 300 and the central cushion 400 may be rapidly deployed and the folding timings thereof may be controlled.

In detail, when a collision situation occurs, a gas may be supplied from the rim cushion inflator 210 and then a gas may be supplied from the central cushion inflator 220 so that the rim cushion 300 is deployed and then the central cushion 400 is unfolded. Since the gas of the rim cushion inflator 210 is supplied first when a collision situation occurs, the rim cushion 300 is deployed and then the gas of the central cushion inflator 220 is supplied and the central cushion 400 is unfolded, so that the central cushion 400 may be supported by the rim cushion 300 when they inflate. As described above, the operation timings of the inflators 200 are controlled such that the central cushion 400 is supported by the rim cushion 300, the rim cushion 300 and the central cushion 400 may be positioned in an optimal shape that absorbs shock which is applied to a driver.

The steering wheel 100 may be configured to be drawn out or stowed in a vehicle body such that when a collision situation occurs, the steering wheel 100 is drawn out and then the gas of the inflator 200 is supplied.

That is, if it is a future type vehicle, the steering wheel 100 is configured to be stowed in the vehicle body and drawn out, if necessary. In the instant case, if the steering wheel 100 is stowed when a collision situation occurs, the rim cushion 300 and the central cushion 400 are deployed by the gases supplied from the inflators 200 after the steering wheel 100 is drawn out, being able to protect a driver from shock and retain the position of the driver.

Drawing out or stowing of the inflators 200, the tether cutter 520, and the steering wheel 100 may be controlled by a controller. The controller may be implemented through a nonvolatile memory configured to store data about algorithms for controlling operation of various components of a vehicle or about software commands for executing the algorithms, and a processor configured to perform operation to be described below using the data stored in the memory. The memory and the processor may be individual chips. Alternatively, the memory and the processor may be integrated in a single chip. The processor may be implemented as one or more processors.

According to the airbag apparatus of a vehicle that has the structure described above, the airbag cushion is mounted in the rim 110 which is necessarily provided even if the shape of the steering wheel 100 is diversified, so that the airbag cushion may be applied to steering wheels 100 having various designs, whereby a driver is protected.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An airbag apparatus comprising:
   a steering wheel mounted on a vehicle body in a front of a driver seat and having a rim having a hollow space along a circumference of the rim; and
   a rim cushion mounted in the hollow space of the rim and configured to inflate to cover the rim by deploying rearward toward the driver seat from the circumference of the rim when a collision situation occurs and a gas of an inflator connected to the rim cushion is supplied,
   wherein the steering wheel is configured to be drawn out from or stowed in the vehicle body, and
   wherein when the collision situation occurs, the steering wheel is drawn out and then the gas of the inflator is supplied.

2. The airbag apparatus of claim 1, further including a central cushion configured to be unfolded toward the circumference of the rim to be positioned inside the circumference of the rim when the gas is supplied from the inflator.

3. The airbag apparatus of claim 2, wherein the central cushion has a width greater than an internal width of the inflating rim cushion when inflating.

4. The airbag apparatus of claim 2, wherein the steering wheel has a hub portion to be mounted on the vehicle body and the inflator is mounted in the hub portion and connected to the rim cushion and the central cushion to supply the gas into the rim cushion and the central cushion.

5. The airbag apparatus of claim 4, wherein the central cushion is positioned at a joint between the rim and the hub portion, and the central cushion is unfolded toward the circumference of the rim when the gas is supplied from the inflator.

6. The airbag apparatus of claim 4, further including:
   a retaining tether having a first end portion fixed to a rear side of the central cushion and a second end portion extending to the hub portion to restrict inflation of the central cushion and to determine an inflation shape of the central cushion; and
   a tether cutter mounted in the hub portion to selectively cut the retaining tether.

7. The airbag apparatus of claim 6, wherein when the tether cutter cuts the retaining tether, the central cushion inflates to have a width greater than an internal width of the rim cushion.

8. The airbag apparatus of claim 7, wherein when the tether cutter does not cut the retaining tether, the central cushion inflates thicker in a front and rear direction thereof, as compared with the retaining tether cut.

9. The airbag apparatus of claim 2,
   wherein the inflator includes a plurality of inflators, which are a rim cushion inflator and a central cushion inflator, and
   wherein the rim cushion inflator and the central cushion inflator are connected to the rim cushion and the central cushion, respectively, to supply the gas to the rim cushion and the central cushion.

10. The airbag apparatus of claim 9, wherein when the collision situation occurs, the gas is supplied from the rim cushion inflator and then is supplied from the central cushion inflator so that the rim cushion is deployed and then the central cushion is deployed.

11. The airbag apparatus of claim 1, wherein the rim has a gas supplier extending around the rim and having a plurality of open holes that fluidically-communicates with the rim cushion through the hollow space.

12. The airbag apparatus of claim 11, wherein the plurality of the open holes is formed such that sizes of the open holes increase as measured away from a position where the gas is supplied from the inflator.

* * * * *